C. J. REIMOLD & N. STODDARD.
Tire-Upsetter.

No. 159,708.

Patented Feb. 9, 1875.

WITNESSES

INVENTORS
C. J. Reimold,
Nolton Stoddard,
Chipman Hosmer & Co
ATTORNEYS

UNITED STATES PATENT OFFICE

CHRISTIAN J. REIMOLD AND NOLTON STODDARD, OF SAGINAW, MICH.

IMPROVEMENT IN TIRE-UPSETTERS.

Specification forming part of Letters Patent No. 159,708, dated February 9, 1875; application filed January 2, 1875.

*To all whom it may concern:*

Be it known that we, CHRISTIAN J. REIMOLD and NOLTON STODDARD, of Saginaw, in the county of Saginaw and State of Michigan, have invented a new and valuable Improvement in Tire-Upsetters; and we do hereby declare that the following is a full, clear, and exact description of the construction and operation of the same, reference being had to the annexed drawings, making a part of this specification, and to the letters and figures of reference marked thereon.

Figure 1:
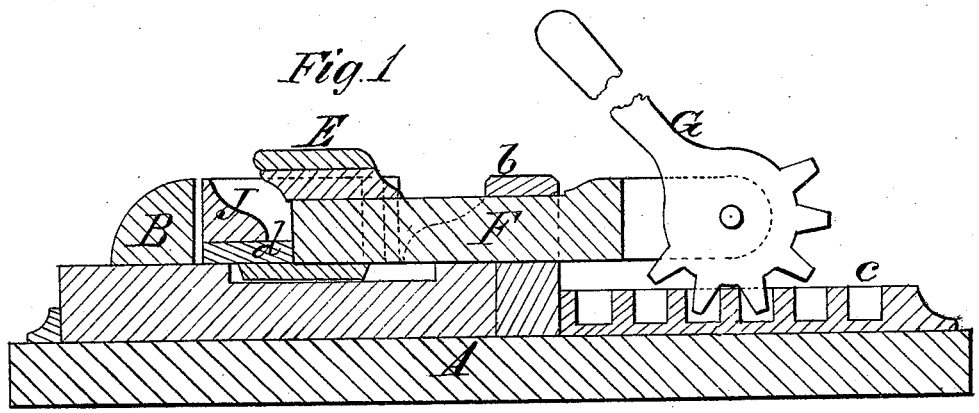
Figure 2:
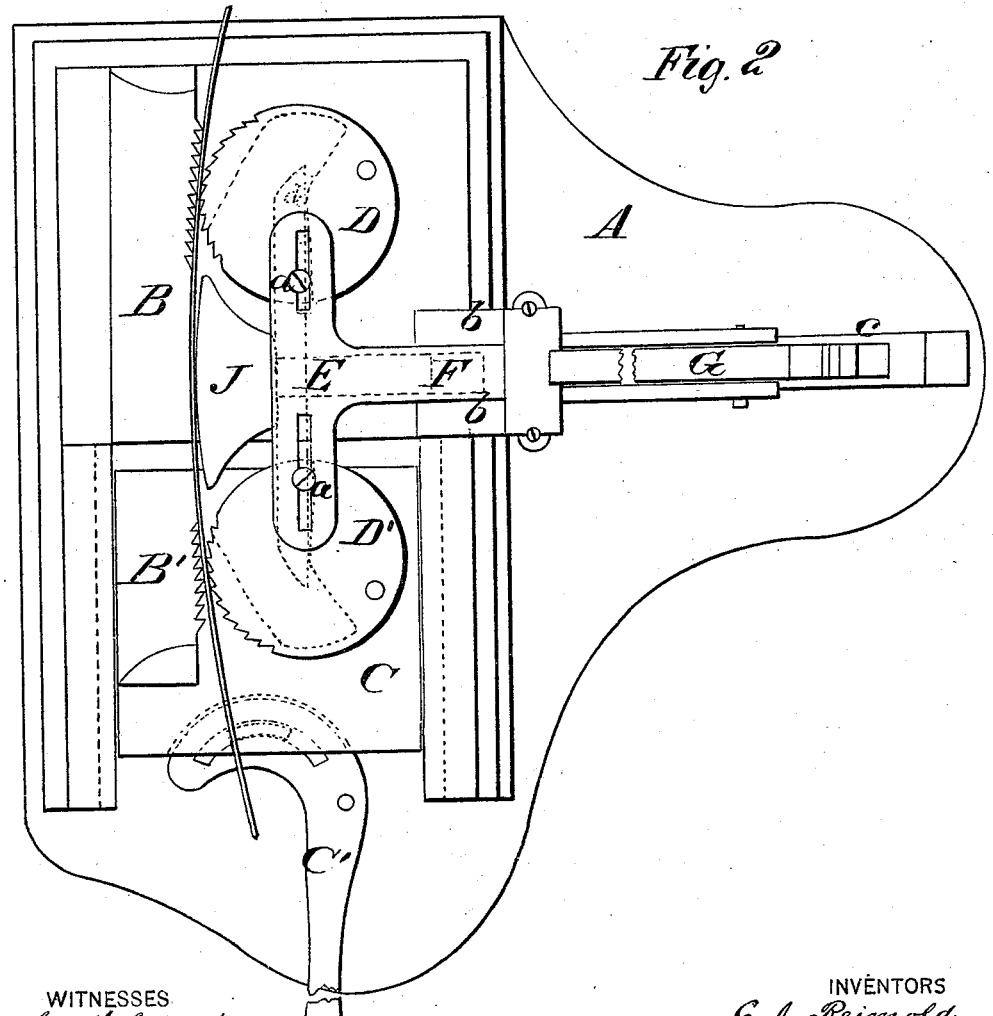

Figure 1 of the drawing is a representation of a vertical longitudinal section of our tire-upsetter, and Fig. 2 is a plan view of the same.

This invention has relation to means for upsetting the tires of wheels; and the nature of our invention consists in the combination of two serrated eccentric jaws, which are actuated by a slide and lever, with a serrated abutment and a clamping-head, as will be hereinafter explained.

In the annexed drawings, A designates the bed of the machine, and B B' two abutments, having serrated surfaces, against which tires are confined while being upset. The abutment B is rigidly secured to the bed A, but the abutment B' is applied upon a sliding block, C, which is movable by means of a horizontal lever, C'. D D' designate two eccentrics, which have serrations on their peripheries. The eccentric D is pivoted on the bed A, opposite the abutment B, and the eccentric D' is pivoted upon the slide C, opposite to the abutment B'. E designates a slotted cross-head, through the slots in which pins $a\ a$ pass, which pins enter the eccentrics D D'. The cross-head E is rigidly secured to the end of an endwise-movable bar, F, which works between guides $b$, and is pivoted to a lever, G. The lever G has a toothed segment on one end, which engages with a rack, $c$, on the bed A, thus affording a shifting fulcrum. Opposite to the smooth part of the face of the abutment B is a clamping-head, J, which is rigidly secured to a bar, $d$, which latter enters cam-shaped recesses in the bottoms of the eccentrics D D'.

The machine is adjusted to receive a tire by moving back the eccentrics D D' and separating the abutment B' a proper distance from the end of the abutment B. The heated tire is then applied between the abutments and eccentrics, and the latter are forcibly pressed against the tire, thus holding it firmly. While the tire is thus held it is upset by moving up the block.

During the upsetting operation the tire is prevented from buckling by means of the clamping-head J.

What we claim as new, and desire to secure by Letters Patent, is—

The eccentrics D D', movable by means of lever G, bar F, cross-head E, and pins $a\ a$, in combination with the abutments B B' and clamping-head J, operating as described.

In testimony that we claim the above we have hereunto subscribed our names in the presence of two witnesses.

CHRISTIAN J. REIMOLD.
  NOLTON STODDARD.

Witnesses:
 ALBERT TRASK,
 FREDERIC E. SMITH.